United States Patent [19]

Cowling

[11] 3,884,761

[45] May 20, 1975

[54] BONDING OF ENZYMES, ENZYME DERIVATIVES AND OTHER COMPOUNDS TO POLYMERIC MATERIALS

[75] Inventor: David Thomas Cowling, Suffolk, England

[73] Assignee: Koch-Light Laboratories Limited, Buckinghamshire, England

[22] Filed: Dec. 4, 1972

[21] Appl. No.: 311,924

[30] Foreign Application Priority Data
Dec. 6, 1971 United Kingdom............... 56621/71

[52] U.S. Cl. .............. 195/68; 195/DIG. 11; 260/79
[51] Int. Cl............................................. C07g 7/02
[58] Field of Search................. 195/63, 68, DIG. 11; 260/79

[56] References Cited
UNITED STATES PATENTS

| | | | |
|---|---|---|---|
| 3,674,767 | 7/1972 | Lilly et al.............................. | 195/63 |
| 3,761,357 | 9/1973 | Epton et al. .......................... | 195/63 |

*Primary Examiner*—Lionel M. Shapiro
*Attorney, Agent, or Firm*—Molinare, Allegretti, Newitt & Witcoff

[57] ABSTRACT

This invention discloses a new method of preparing a hydrophilic water-insoluble polymer with molecular chains having repeating thiol or thiolacetone side groupings to which biologically active molecules can be attached.

6 Claims, No Drawings

BONDING OF ENZYMES, ENZYME DERIVATIVES AND OTHER COMPOUNDS TO POLYMERIC MATERIALS

This invention relates to the bonding of biologically active molecules, such as, for example, enzymes, enzyme derivatives to polymeric materials and is particularly concerned with polymeric materials to which biologically active molecules have been bonded to render them insoluble and to certain polymeric materials to which enzymes, enzyme derivatives and other compounds can be bonded.

BACKGROUND OF THE INVENTION

In our copending application, U.S. Ser. No. 206,855 filed Dec. 10, 1971, now U.S. Pat. No. 3,846,306 the teachings of which are incorporated by refernce herein, there is provided and claimed a hydrophilic water-insoluble polymer having along its molecular chains repeating thiol and/or thiolactone side groups to which biologically active molecules are attached, the polymer with attached biologically active molecules being water insoluble.

THE INVENTION

We have now found an improved method of making water-insoluble hydrophilic polymers. Therefore, according to the invention there is provided a method of making such a hydrophilic water-insoluble polymer in which an N-substituted thiazolidine is polymerized, possibly together with one or more copolymerisable monomers, in the presence of inert gas to give a polymer having thiazolidine side groups and those thiazolidines side groupings are then hydrolyzed to give a polymer having thiol side groupings.

PREFERRED EMBODIMENTS OF THE INVENTION

The N-substituted thiazolidine which is employed is preferably N-acryloyl-4-carbomethoxy-2,2 dimethyl thiazolidine.

A particularly preferred polymer is obtained by copolymerizing N-acryloyl-4-carbomethoxy-2,2 dimethyl thiazolidine with acrylamide and methylene-bis-acrylamide. This can be performed in an ethanolic solution in the presence of nitrogen gas, and then hydrolysing the resulting copolymer having pendant thiazolidine groups to form the thiol groups. The preferred hydrolysing agent is hydrochloric acid, although other suitable agents can be used.

As explained in our copending application, U.S. Ser. No. 206,855 the resulting hydrophilic water-insoluble polymers can be attached to biologically active molecules such as, for example, enzyme molecules and have all the properties described in that application.

The invention will now be illustrated with reference to the following Example.

EXAMPLE

Preparation of a water-insoluble hydrophilic poly thiol (copolymer B'')

Cysteine methyl ester hydrochloride

Anhydrous cysteine hydrochloride (80 g) dissolved in methanol (400 ml) was heated to gentle reflux with the passage of dry hydrogen chloride gas for 2.5 hours. Methanol (200 ml) was distilled off at reduced pressure and the product crystallized by cooling the residue in ice for 24 hours. The crystals were collected by filtration and dried over $CaCl_2$ in a dessicator. Yield (73 g) melting point 140°–142°C.

4-Carbomethoxy-2,2-dimethyl thiazolidine

A suspension of cysteine methyl ester hydrochloride (29 g) in acetone (575 ml) was refluxed for 15 hours, cooled to room temperature and filtered. The white crystalline solid was dissolved in the minimum amount of water and the solution covered with twice the volume of ether. The aqueous layer was basified with sodium carbonate, the ethereal extract separated, dried over anhydrous magnesium sulphate and evaporated at reduced pressure. Vacuum distillation of the residual oil gave the product as a water-white oil. Yield (24.7 g). Boiling point (at 1 mm) 70°C $n^{20}_D$ —187.6° ($c = 4.61$, $CHCl_3$). T.L.C. single ninhydrin positive spot RF. 0.65 ( B). The infrared spectrum (liquid film) showed bands at 3,300, 2,950, 1,740, 1,440, 1,370, 1,340, 705 $cm^{-1}$.

N-Acryloyl-4-carbomethoxy-2,2-dimethyl thizolidine

A solution of acryloyl chloride (12.0 g) in anhydrous ether (30 ml) was added dropwise, with stirring, to a solution of 4-carbomethoxy-2,2-dimethyl thazolidine (22.5 g) and anhydrous triethylamine (13.2 g) in anhydrous ether (120 ml) at 0°C. The mixture was stirred overnight at room temperature, filtered and the insoluble triethylamine hydrochloride washed well with additional anhydrous ether. The combined mother liquors and washings were washed with cold 2N $H_2SO_4$ (2 × 50 ml) N $HaHCO_3$ solution (50 ml) and water (50 ml), dried over dry magnesium sulphate and evaporated at reduced pressured. The pale yellow crystalline residue was recrystallized from cydohexane (75 ml). Yield (17.1 g) melting point 87° to 88°C $n^{20}_D$ — 70.0° ($c = 5.5$, $CHCl_3$) T.L.C. single ninhydrin negative, iodine positive spot R.F. 0.8 (solvent B). The infrared spectrum (KBr) showed bonds at 3,400, 2,950, 1,740, 1,650, 1,620, 1,420, 1,360, 1,340, 980 $cm^{-1}$.

Copolymer of N-acryloyl-4-carbomethoxy 2,2-dimethyl thiazolidine and acrylamide (copolymer G)

A solution of $\alpha,\alpha'$-azo-bisiso-butyronitrile (0.5 g) in ethanol (200 ml) was added to a stirred, filtered solution of acrylamide (55 g), methylene bis acrylamide (8 gm) and N-acryloyl-4-carbomethoxy-2,2-dimethyl thiazolidine (48.5 gm) in ethanol (500 ml) through which nitrogen was passed. After 15 minutes, the solution was heated to 75°C for 24 hours. The polymer started to separate after 15 minutes.

The mixture was cooled to room temperature and the polymer collected by filtration, washing with ethanol and ether. The polymer was dried over silica gel in a desicator. Yield (92.5 g) The infrared spectrum (KBr) showed bands at 3,700, 2,950, 1,740, 1,660 980 $m^{-1}$.

Conversion of copolymer G to copolymer B''

A suspension of copolymer G (20 g) in 1N hydrochloric acid (500 ml) was heated to 70°C for 3 hours, after which time it was cooled to room temperature. The solid was filtered off, washed with oxygen-free water (5 × 250 ml), cysteine hydrochloride solution (0.1M in oxygen-free water 500 ml), oxygen-free water (5 × 250 ml) and suspended in acetone (1.0 L). After 1 hour, the solid was filtered off, washed with ether and dried over silica gel in a dessicator. The product was a white powder (16.2 g). The infrared spectrum (KBr) showed bands at 3,400, 2,950, 1,640–1,730, 980, 2,600 $cm^{-1}$.

I claim:

1. A method of making a hydrophilic water-insoluble polymer with molecular chains having repeating thiol side groupings to which biologically active molecules are attached to give a combined water-insoluble polymer and biologically-active molecule comprising,
   a. polymerizing an N-substituted thiazolidine in the presence of an inert gas to give a polymer having thiazolidine side groups,
   b. hydrolyzing said thioazolidine side groupings to give a polymer having thiol side groupings, and
   c. bonding biologically active molecules through the thiol side groups to the hydrophilic water-insoluble polymer.

2. The method according to claim 1 wherein said N-substituted thiazolidine is N-acryloyl-4-carbomethoxy-2,2 dimethyl thiazolidine.

3. The method according to claim 2 wherein said N-acryloyl-4-carbomethyoxy-2,2 dimethyl thiazolidine is additionally polymerized with acrylamide and methylene-bis-acrylamide.

4. The method according to claim 3 wherein said polymerization is performed in an ethanolic solution and said inert gas is nitrogen.

5. The method according to claim 1 wherein said hydrolyzing is performed with hydrochloric acid.

6. The method according to claim 1 wherein said thiazolidine is additionally polymerized with acrylamide and methylene-bis-acrylamide.

* * * * *